US006211449B1

(12) United States Patent
Lai

(10) Patent No.: US 6,211,449 B1
(45) Date of Patent: Apr. 3, 2001

(54) PERCUSSION INSTRUMENT PEDAL WITH AN ADJUSTABLE WEIGHT

(76) Inventor: Mu-Sen Lai, No. 51-4, Fan-Po St., Fu-Hsin Hsiang, Changhwa Hsien (TW)

( * ) Notice: Subject to any disclaimer, the term of this patent is extended or adjusted under 35 U.S.C. 154(b) by 0 days.

(21) Appl. No.: 09/572,202

(22) Filed: May 17, 2000

(51) Int. Cl.[7] .................................................... G01D 13/02

(52) U.S. Cl. ........................ 84/422.1; 84/422.2; 84/422.3

(58) Field of Search ............................... 84/422.1, 422.2, 84/422.3

(56) References Cited

U.S. PATENT DOCUMENTS 5,574,237 * 11/1996 Yanagisawa ........................ 84/422.1

* cited by examiner

*Primary Examiner*—Shih-Yung Hsieh
(74) *Attorney, Agent, or Firm*—Alan Kamrath; Rider Bennett Egan & Arundel, LLP.

(57) ABSTRACT

A percussion instrument pedal with an adjustable weight has a pedal assembly including a pedal (30) with one end pivotally mounted on one end of the base (60), a weight adjustment device (20) mounted on the bottom of the pedal (30) and having a longitudinal axis parallel to the longitudinal axis of the pedal (50), the weight (10) being slidably mounted on the weight adjustment device (20) and used to adjust the center of mass of the pedal (10) by shifting the position of the weight (10) on the weight adjustment device (20).

3 Claims, 5 Drawing Sheets

PERCUSSION INSTRUMENT PEDAL WITH AN ADJUSTABLE WEIGHT

BACKGROUND OF THE INVENTION

1. Field of the Invention

The present invention relates to a percussion instrument pedal with an adjustable weight, more particularly, to a percussion instrument pedal capable of adjusting the volume of the sound emitted from the instrument by the weight movably mounted on the pedal.

2. Description of Related Art

With reference to FIG. 5, the conventional percussion instrument pedal (50) is provided to make sound by striking percussion instruments such as a drum, cymbals, gong and the like. This conventional percussion instrument pedal (50) includes a base (60), a pedal (50), two pillars (61), a rod (62), a mallet base (63), a chain (64), a shaft (65) and a mallet (66). One end of the pedal (50) is pivotally connected to one end of the base (60). The two pillars (61) are fixedly mounted on the other end of the base (60). The rod (62) is pivotally mounted on the ends of the two pillars (61). The mallet base (63) is fixedly mounted on the rod (62). The chain (64) is attached between the free end of the pedal (50) and the mallet base (63). One end of the shaft (65) is attached to the mallet base (63), and the other end extends radially out from the mallet base (63). The mallet (66) is fixedly attached to the free end of the shaft (65). Each end of the rod (62) passes through a pillar (61) and has a locking piece (622) is fixedly mounted on each end. A spring (611) is connected between one blocking piece (622) and the end of the base (60).

The conventional percussion instruments pedal, in fact, is workable. However, neither the striking speed nor the striking power of the conventional instrument percussion pedal is adjustable. Therefore, the conventional instruments percussion pedal is not suitable in the case where the sound must be changed. Therefore, an instruments percussion pedal that is adjustable in terms of striking speed and striking sound is desired.

SUMMARY OF THE INVENTION

The objective of the present invention is to provide a percussion instrument pedal capable of adjusting the volume of the sound emitted from the instrument.

To achieve the objective, the percussion instrument pedal with an adjustable weight in accordance with the present invention comprises a weight movably fixed on the pedal to adjust the speed and the strength of the mallet, such that the sound is adjustable.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
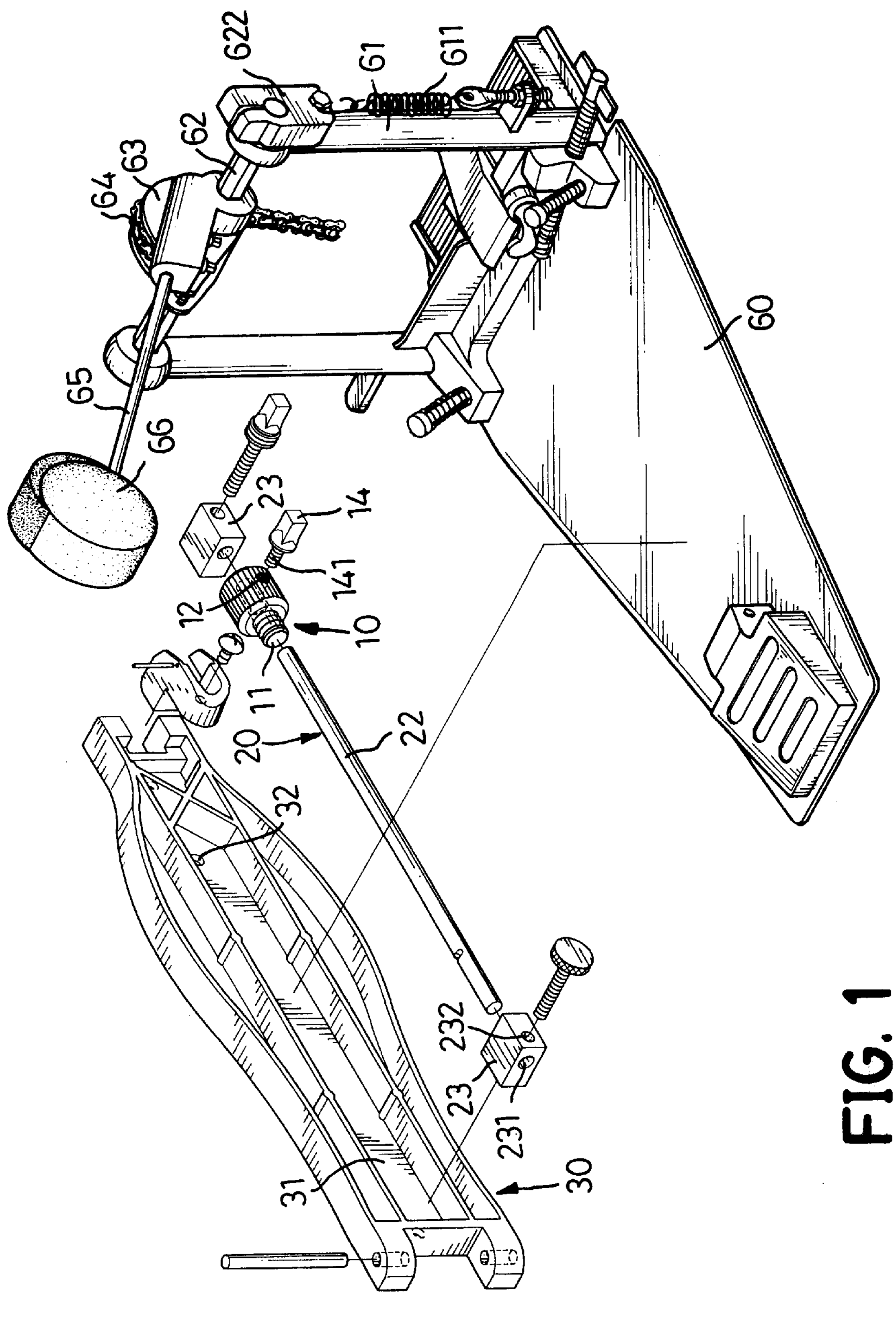
FIG. 1 is an exploded perspective view of the percussion instrument pedal with an adjustable weight in accordance with the present invention.
Figure 2:
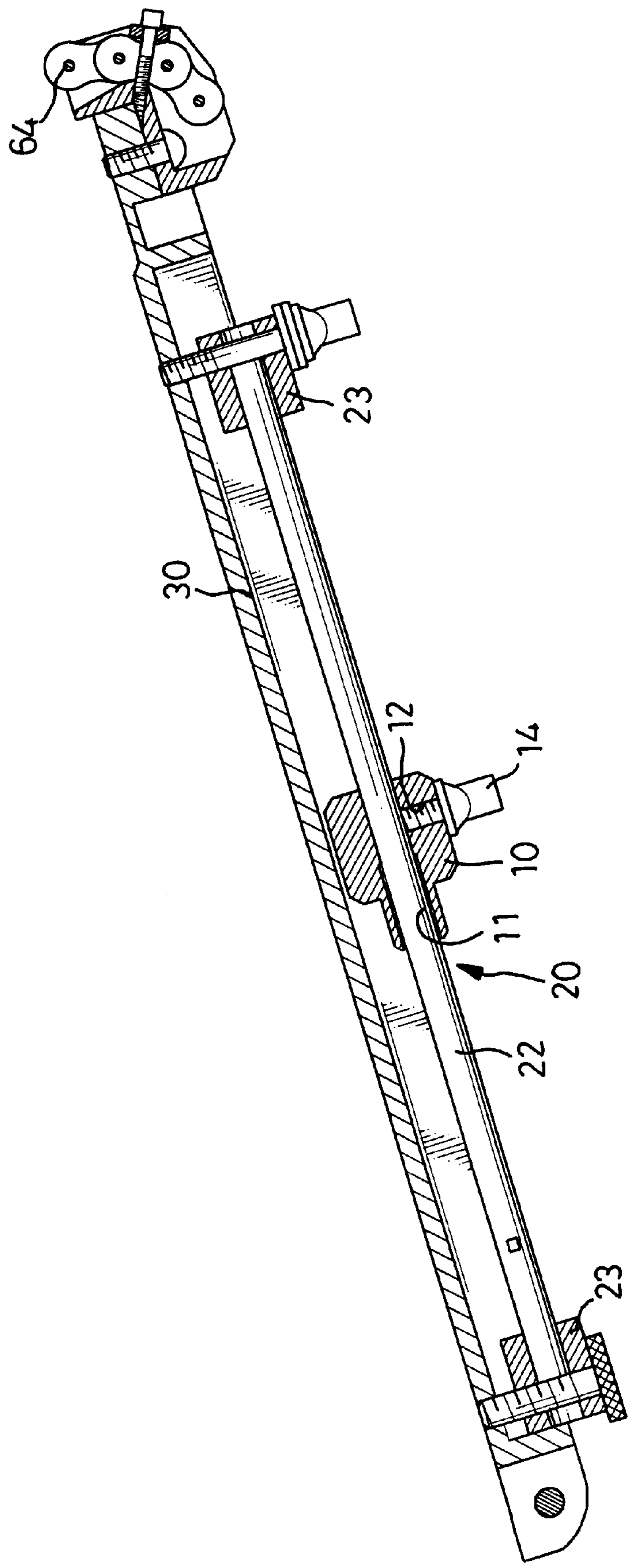
FIG. 2 is a side plan view of the percussion instrument pedal with an adjustable weight in FIG. 1.
Figure 3:
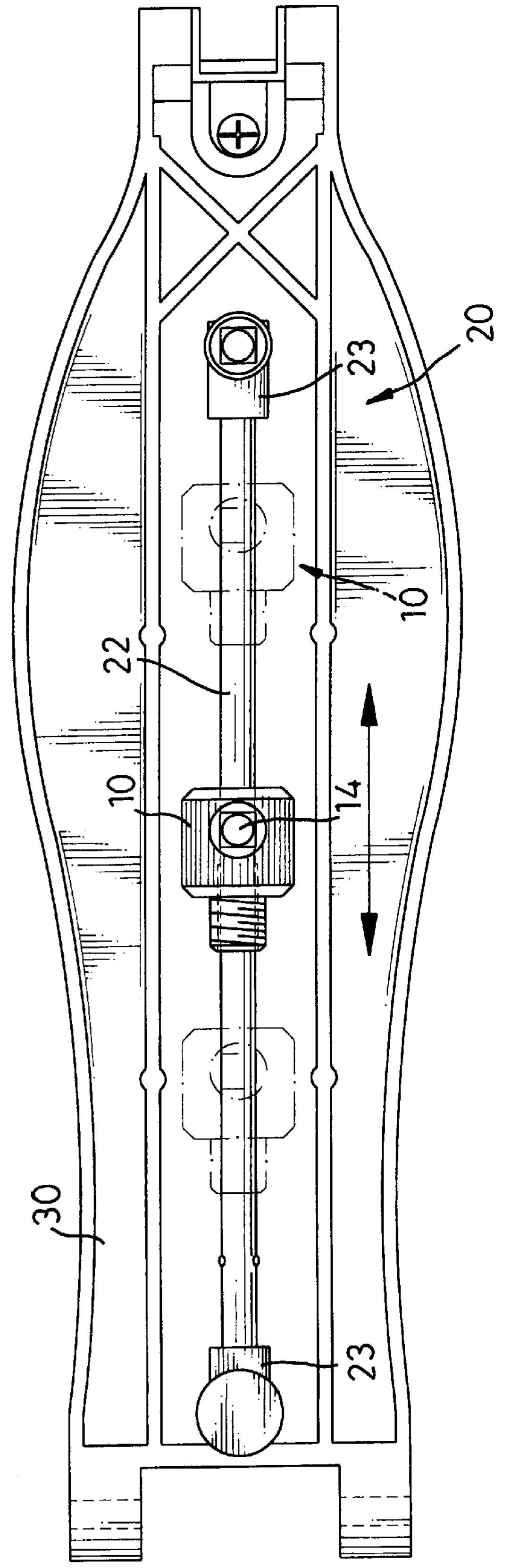
FIG. 3 is a bottom plan view of the percussion instruments pedal with an adjustable weight in FIG. 1.

With reference to FIGS. 1, 2 and 3, the percussion instrument pedal with an adjustable weight in accordance with the present invention is similar to the conventional percussion instruments pedal, except a weight (10) is adjustably fixed on the pedal. The percussion instrument pedal with an adjustable weight in accordance with the present invention includes a base (60), a pedal assembly and a striking assembly.

The base (60) is a plate with a pedal (30) pivotally connected to one end and two pillars (61) fixedly mounted on the other end.

The pedal assembly essentially comprises a pedal (30), a weight adjustment device (20) and a weight (10). One end the pedal (30) is pivotally connected to one end of the base (60). An open space (31) is defined on the bottom face of the pedal (30). A threaded hole (32) is defined at each end of the open space (31).

The weight adjustment device (20) is mounted on the bottom of the pedal (30) with the longitudinal axis parallel to the longitudinal axis of the pedal (50). The weight (10) is slidably mounted on the weight adjustment device (20) and is used to adjust the center of mass of the pedal (10) by shifting the position of the weight (10) on the weight adjustment device (20).

The striking assembly comprises a rod (62), a mallet base (63), a shaft (65), a mallet (66) and a chain (64). The rod (62) is rotatably mounted between the ends of the two pillars (611). The mallet base (63) is fixedly mounted on the rod (62). One end the shaft (65) is fixedly connected to the mallet base (63), and the mallet (66) fixedly mounted on the other end. One end of the chain (64) is connected to the free end of the pedal (30), and the other end is connected to the mallet base (63). Each end of the rod (62) extends through the corresponding pillar (62), and one end of the rod (62) is held by a locking piece (622). A spring (611) is further provided between the locking piece (622) and the base (60).

Figure 4:
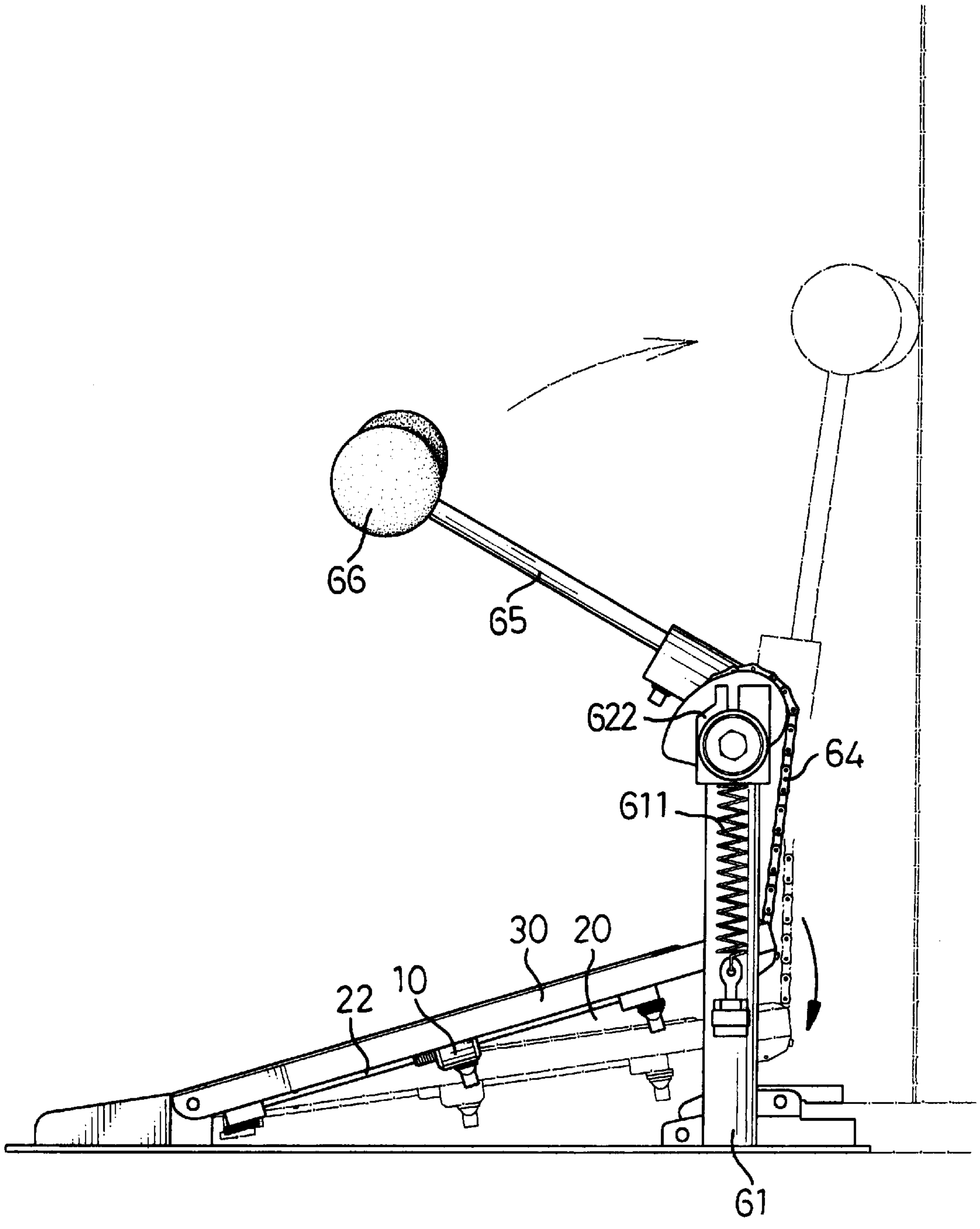
FIG. 4 is a side plan view of the percussion instrument pedal with an adjustable weight in FIG. 1.
Figure 5:
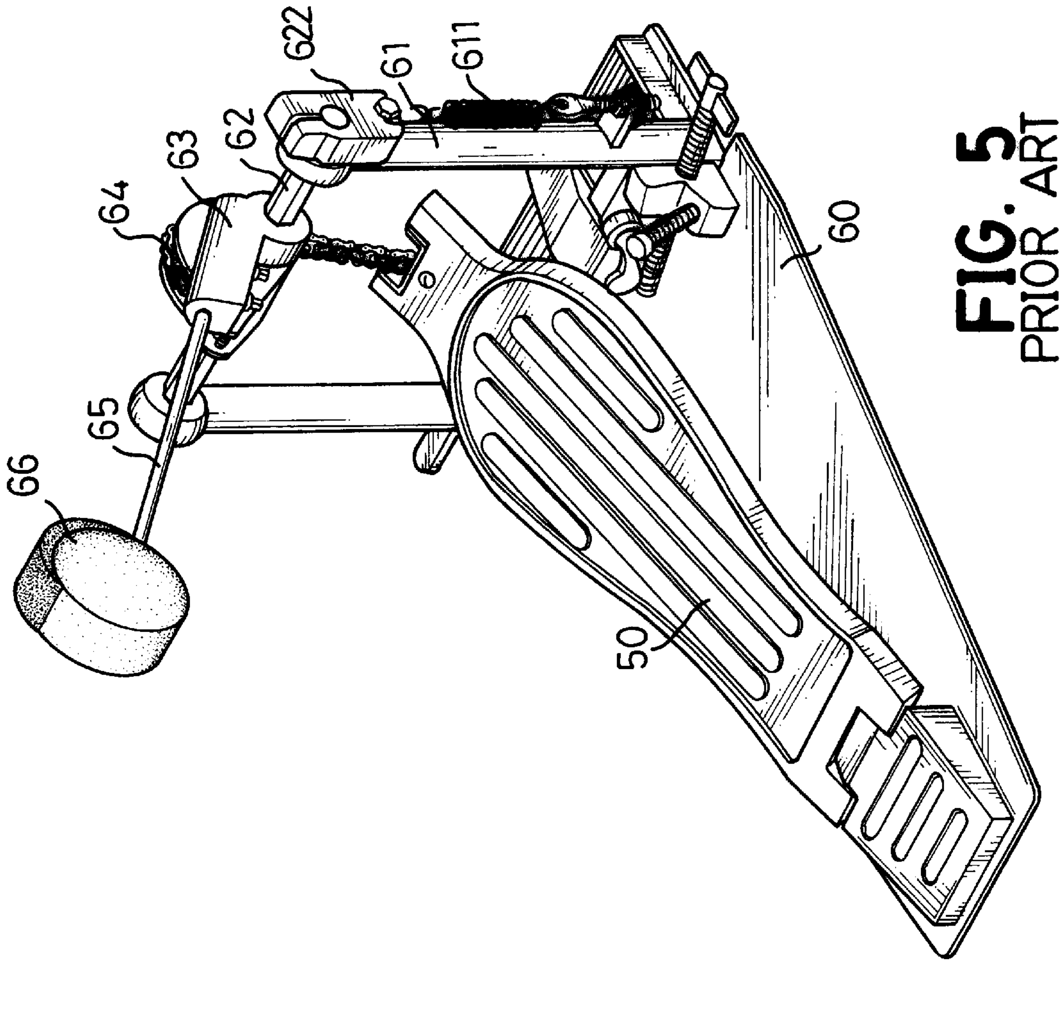
FIG. 5 PRIOR ART
FIG. 5 is a perspective view of a conventional percussion instrument pedal.

With the foregoing configuration, whenever the pedal (30) is pressed, the mallet (66) will be moved by the chain (64) pulling on the mallet base (63). Additionally, when the force applied to the pedal (30) is released, the mallet (66) will return to the original place by the restoring force of the spring (611). (Please see FIG. 4.)

The weight adjustment device (20) comprises a rod (22), two mounting blocks (23) and a hollow weight (10). A through hole (232) is defined through each mounting block (23) such that a mounting blocks (23) can be installed at each end of the recessed area (31) in the bottom of the pedal (30). A bolt extends through the through hole (232) in the mounting block and screws into the threaded hole (32) in the open space (31) on the bottom of the pedal. A blind hole (231) is formed in the sides of the mounting block (23) facing each other. The ends of the rod (22) are inserted into the blind holes (231) to hold the rod (22) in place.

The weight (10) is hollow such that it can be moveably mounted on the rod (22) between the mounting blocks (23). A hole (11) is defined through the weight (10); and a threaded setscrew hole (12) is defined radially in the weight (10). The weight (10) is fixed in the desired position on the rod (22) by the a setscrew (14). The threaded end (141) of the setscrew (14) is screwed into the setscrew hole (12) to press against the rod (22) and lock the weight (10) in place.

When one wants to change the position of the weight (10) on the rod (22), the setscrew (14) is loosened, the weight (10) is moved to the desired position on the leading rod (22), and the setscrew (14) is tightened to lock the weight (10) in position. Therefore, the center of mass of the pedal (10) is changed, such that the speed and the strength of the pedal (30) will be changed.

Although the present invention has been explained in relation to its preferred embodiment, it is to be understood that many other possible modifications and variations can be made without departing from the spirit and scope of the invention as hereinafter claimed.

What is claimed is:

1. A percussion instrument pedal with an adjustable weight, comprising:

a base (60) having two pillars (61) attached to one end thereof;

a pedal assembly comprising a pedal (30) with one end pivotally mounted on another end of the base (60), a weight adjustment device (20) mounted on a bottom of the pedal (30) and having a longitudinal axis parallel to a longitudinal axis of the pedal (30), the adjustable weight (10) being slidably mounted on the weight adjustment device (20) and used to adjust the center of mass of the pedal (10) to (30) by shifting position of the adjustable weight (10) on the weight adjustment device (20); and a striking assembly comprising:

a rod (62) rotatably mounted between the two pillars (611);

a mallet base (63) fixedly mounted thereon;

a shaft (65) with one end fixedly attached to the mallet base (63) and another end fixedly mounted on a mallet (66); and a chain (64) with one end connected to the free end of the pedal (30) and another end connected to the mallet base (63).

2. The percussion instrument pedal with an adjustable weight as claimed in claim 1, wherein each end of the rod (62) extends out of the pillar (62) and one end of the rod (62) is held by a locking piece (622); and a spring (611) is further provided between one of the locking pieces (622) and the base (60).

3. The percussion instrument pedal with an adjustable weight as claimed in claim 1, wherein the weight (10) is a hollow block with a through hole (11) defined therethrough; and a threaded setscrew hole (12) radially defined therein, wherein a setscrew (14) with a threaded end (141) can be screwed into the setscrew hole (12).

* * * * *